(12) United States Patent
Boday et al.

(10) Patent No.: US 10,227,444 B2
(45) Date of Patent: Mar. 12, 2019

(54) DEGRADABLE POLYURETHANES CONTAINING THIOAMINAL GROUPS

(71) Applicant: International Business Machines Corporation, Armonk, NY (US)

(72) Inventors: Dylan J. Boday, Tucson, AZ (US); Jeannette M. Garcia, San Leando, CA (US); James L. Hedrick, Pleasanton, CA (US); Rudy J. Wojtecki, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 15/170,375

(22) Filed: Jun. 1, 2016

(65) Prior Publication Data

US 2017/0349694 A1 Dec. 7, 2017

(51) Int. Cl.
| | | |
|---|---|---|
| C08G 18/87 | (2006.01) | |
| C08G 83/00 | (2006.01) | |
| C08G 18/12 | (2006.01) | |
| C08G 18/73 | (2006.01) | |
| C08G 18/67 | (2006.01) | |
| C08G 18/32 | (2006.01) | |
| C08G 18/38 | (2006.01) | |

(52) U.S. Cl.
CPC ............ *C08G 18/87* (2013.01); *C08G 18/12* (2013.01); *C08G 18/3206* (2013.01); *C08G 18/3212* (2013.01); *C08G 18/3876* (2013.01); *C08G 18/675* (2013.01); *C08G 18/735* (2013.01); *C08G 83/004* (2013.01); *C08G 2230/00* (2013.01)

(58) Field of Classification Search
CPC .... C08G 18/833; C08G 18/87; C08K 5/3492; C08K 5/372
See application file for complete search history.

(56) References Cited

U.S. PATENT DOCUMENTS

| | | | | |
|---|---|---|---|---|
| 4,013,625 | A * | 3/1977 | Wagner | C08G 18/833 521/53 |
| 4,018,849 | A * | 4/1977 | Chang | C08G 18/833 525/440.08 |
| 4,192,925 | A * | 3/1980 | Schafer | C08G 18/3819 521/163 |
| 4,195,132 | A * | 3/1980 | Sundermann | B22D 41/34 521/155 |
| 4,983,662 | A * | 1/1991 | Overbeek | C08G 18/0823 524/501 |
| 5,166,232 | A | 11/1992 | Muller et al. | |
| 6,239,192 | B1 * | 5/2001 | Muller | A01M 1/2055 523/124 |
| 8,865,149 | B2 | 10/2014 | McManus et al. | |
| 9,228,059 | B2 | 1/2016 | Boday et al. | |
| 9,326,934 | B2 | 5/2016 | Gravett et al. | |
| 2014/0037746 | A1 | 2/2014 | Ashton et al. | |

FOREIGN PATENT DOCUMENTS

| | | | | |
|---|---|---|---|---|
| EP | 0469930 A2 * | 2/1992 | | C08G 18/833 |
| WO | 2008116913 A2 | 10/2008 | | |

* cited by examiner

*Primary Examiner* — Michael M Dollinger
(74) *Attorney, Agent, or Firm* — Patterson + Sheridan, LLP

(57) ABSTRACT

Embodiments of the disclosure generally provide compositions and methods related to oligomeric and polymeric urethane materials that contain hydrolyzable polythioaminal groups for use in biomedical applications.

11 Claims, 1 Drawing Sheet

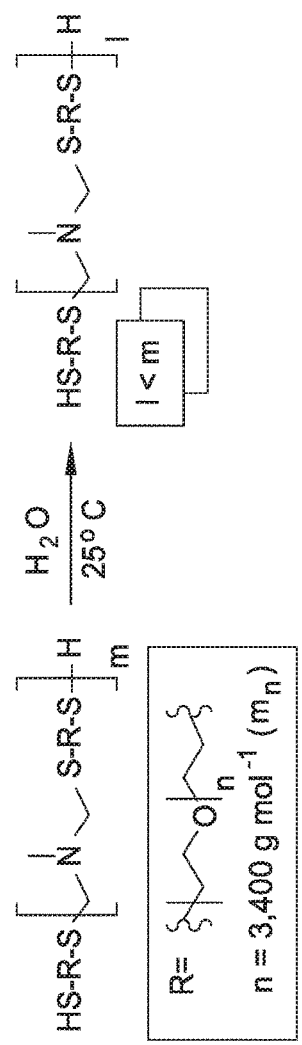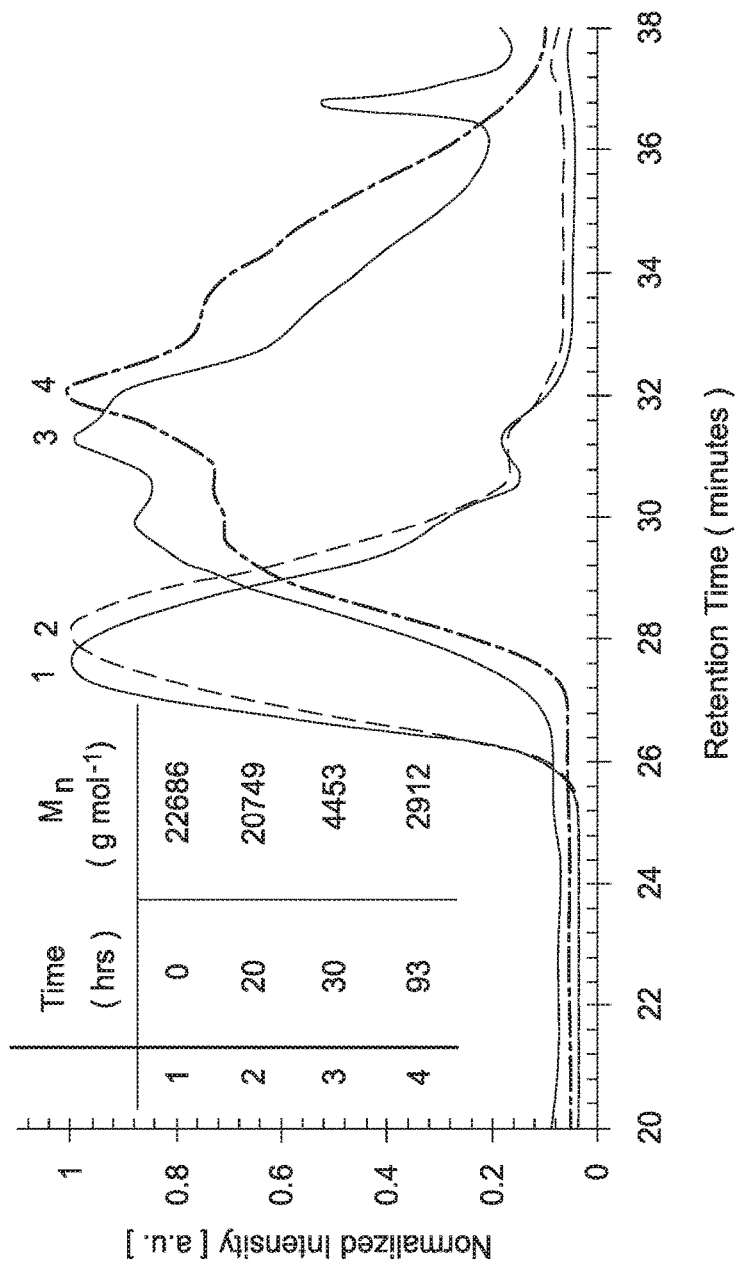

DEGRADABLE POLYURETHANES CONTAINING THIOAMINAL GROUPS

FIELD

The present disclosure generally relates to biocompatible polyurethanes containing degradable thioaminal groups.

BACKGROUND

Polyurethane based materials have been employed for use in the biomedical field for device implants as they exhibit good biocompatibility. Examples of such applications include indwelling catheters, intra-aortic balloons and mammary implants. Most biomedical polyurethane applications emphasize and focus on material physical properties, such as bio-stability, modulus, hardness, and elongation, however, many other biomedical applications, such as tissue engineering, require polyurethanes that rapidly degrade and form nontoxic by-products.

One of the unique aspects and advantages of polyurethanes is that their mechanical properties may be precisely tuned by changes in the ratio of monomers used in a polyurethane polymerization. For example, segmented polyurethanes produced from different types of monomers (soft blocks and hard blocks) phase segregate into soft rubbery segments and hard glassy segments, depending on the monomers selected. Therefore, if an application requires a soft flexible material with a high percentage of a monomer contributing to a soft segment, those skilled in the art may adjust the monomer ratios accordingly.

In the case of tissue engineering, elastomeric materials, such as polyurethanes, may be used to provide flexible scaffolds for cell growth. In some cases, hydrolyzable soft polymer segments such as polylactide (PLA) and polycaprolactone (PCL) have been incorporated into polyurethanes to make them degradable by ester linkage hydrolysis in vivo. One of the difficulties with the current approach is the adjustment of the rate of degradation, which can often times take months, and create toxic by-products which produce undesirable effects that counter or inhibit tissue scaffolding. Therefore, there is a need for new biodegradable and biocompatible polyurethanes that degrade more quickly than existing materials and produce non-toxic byproducts.

SUMMARY

Described in this disclosure is a method of producing a biodegradable urethane material containing thioaminal groups, and involves forming a urethane oligomer or a urethane polymer with functional groups; reacting the functional groups with a sulfur compound to produce thiol groups; and heating and reacting the thiol groups with hexahydrotriazine compounds to produce a biodegradable urethane material containing thioaminal groups. The method includes functional groups that are: are terminal groups, pendant groups, unsaturated carbon groups, and alkene groups. Sulfur compounds that are useful to produce the thiols of this disclosure includes dihydrogen sulfide, and the thiols groups may be a reaction product of a Michael addition reaction.

The method also includes forming a urethane oligomer or a urethane polymer with functional groups, reacting the functional groups with a sulfur compound to produce thiol groups, and heating and reacting the thiol groups with hexahydrotriazine compounds to produce a biodegradable urethane material containing thioaminal groups that are performed in one reaction vessel. In some cases, the biodegradable urethane material may have thioaminal groups that are a reaction product of a sequential addition of some of the starting materials. The biodegradable urethane material of this disclosure having thioaminal groups hydrolyzes in aqueous media, and the hydrolysis products of the biodegradable urethane material containing thioaminal groups are non-toxic.

The disclosure also provides a biocompatible polymer with urethane groups and thioaminal groups, wherein the thioaminal groups hydrolyze. The polymer has urethane groups that have a repeat unit of at least 2 and less than 100, and the thioaminal groups have a repeat unit of at least 2 and less than 100. The biocompatible polymer also has at least one oligomeric or polymeric thioaminal terminal or end group, and may be an "ABA" block copolymer, wherein A is an oligomeric or polymeric thioaminal group, and B is a urethane oligomer or polymer. Alternatively, polymer may be a random copolymer. The biocompatible polymer may also be a dendritic polymer. The biocompatible polymer described herein may also contain oligomeric or polymeric urethane groups that have at least one pendant thioaminal group, and the thioaminal group may be a crosslinking group.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of the disclosure and are therefore not to be considered limiting of its scope, for the disclosure may admit to other equally effective embodiments.

FIG. 1 is size exclusion chromatography data according to a prior art reaction.

DETAILED DESCRIPTION

The present disclosure provides new compositions and methods involving biocompatible and degradable urethane oligomer sand polymers or urethane containing materials that produce non-toxic byproducts when subjected to hydrolysis. It has been found that the incorporation of thioaminal segments, linkages and/or groups in a urethane material produces a new material that is suitable for biomedical applications such as tissue scaffolding. Thioaminal groups that may be incorporated into a urethane material may be monomeric, oligomeric and/or polymeric. Polythioaminals may be produced from the ring opening polymerization of hexahydrotriazines using dithiols, as shown in reaction example 1.

Reaction Example 1

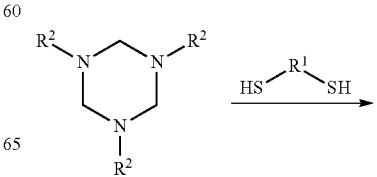

-continued

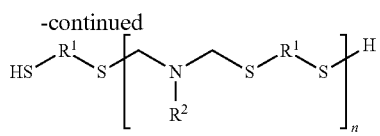

In embodiments of this disclosure, and as illustrated in reaction example 1, a dithiol may contain an $R^1$ group that may be an organic or a hetero-organic group (containing atoms other than C, such as N, O and others), and $R^1$ may also be an oligomer, polymer chain or polymer segment containing a urethane or polyurethane group, and/or may be a polyurethane group in it's entirety. In some embodiments, the number of urethane repeat units ($R^1$) may be between about 2 to about 100, such as between about 2 and about 20 repeat units. The polythioaminal segment (n) that contains $R^1$ (the urethane oligomer or polymer segment) may be between about 2 to about 25, such as between about 2 and about 10, repeat units. In some embodiments, $R^1$ is a polyurethane that may contain at least three thiol groups, which may be pendant to the polyurethane main chain or may be main chain end capping or terminal groups, and may produce a branched or dendritic polythioaminal with a polyurethane core or center. The $R^2$ may be an organic or hetero-organic group or a heteroatom, such as hydrogen. Organic group examples of $R^2$ include, but are not restricted to alkyl groups such as methyl, ethyl, propyl, butyl, hexyl, or cyclohexyl. We note that as the size of an $R^2$ group increases, the degree of polymerization and polymer molecular weight may decrease due to steric effects.

Generally, reaction example 1 may be performed using N-methyl pyrrolidone (NMP) as solvent, or using the reactants alone as solvent. In one embodiment, the reaction may be performed in excess hexahydrotriazine up to about 2 equivalents, such as from between about 1.3 to about 1.5 equivalents, such as about 1.3 equivalents. One exemplary synthesis is as follows: in a stirred vessel, a dithiol (such as an oligomeric or polymeric urethane dithiol) is added to 1.3 equivalents of a hexahydrotriazine precursor. The vessel is purged with an inert gas such as nitrogen, sealed, and the reaction mixture is heated to 85° C. The reaction mixture is maintained at 85° C. for 18 hours to form oligomers and/or polymers. Vacuum is then applied to the vessel to remove volatile byproducts, driving growth in molecular weight of the resulting polymer molecules according to Le Chatelier's Principle. The reaction is allowed to proceed for 24 hours, during which stirring may cease due to viscosity of the mixture. The resulting polymer is typically optically transparent and may range from a solid to a viscous liquid. We note that reaction example 1 may be carried out by stepwise addition of the reagents or starting materials, with isolation and purification steps known to those skilled in the art. Alternatively, one may combine all the starting materials in "one pot" or reaction vessel and then heated to produce a random copolymer with urethane and thioaminal groups. This will be discussed in more detail later in this disclosure. The precursors or starting materials may be obtained from a number of commercial suppliers such as Sigma-Aldrich, USA or may be synthesized.

In another embodiment of this disclosure, and in reference to reaction example 1, a "chain extension technique" may be used to produce an ABA structured copolymer in which A is a biodegradable thioaminal oligomer or polymer segment(s), and B is a urethane oligomer or polymer segment. Such a technique may use a difunctional or chain end functional urethane polymer also known as a "telechelic polymer" to produce an "ABA" structured copolymer in which A is a biodegradable polythioaminal, and B is a polyurethane. As shown in reaction example 2, one approach to a functional telechelic polyurethane involves the reaction of a diisocyanate with a diol in the presence of an end capping reagent in a first step of the reaction sequence. The end capping reagent controls the polyurethane molecular weight and creates one or more functional end-groups on the polyurethane chain that are useful for chain extension reactions leading to the formation of a ABA copolymer. One useful class of end capping reagents includes, but is not restricted to, monofunctional alcohols, such as an allyl alcohol, as shown in reaction example 2. The introduction of an allyl alcohol to such a reaction mixture caps the growing polyurethane chains, stopping chain growth and yielding a polyurethane of a desired molecular weight that is terminated by two alkene groups. In a next step, as shown in reaction example 2, the alkene end groups of the polyurethane oligomer or polymer may be converted to thiol groups by contact with hydrogen sulfide (a Michael addition type reaction) to produce a thiol functional telechelic urethane oligomer or polymer. In the final step of the reaction sequence, the thiol capped telechelic urethane oligomer or polymer may undergo a ring opening reaction with a hexahydrotriazine or N-alkylated isomers, in a chain extension reaction to form polythioaminal segments on each end of the urethane oligomer or polymer. This step also involves the extrusion or loss of ammonia or an amine group that was formerly part of the hexahydrotriazine ring.

Reaction Example 2

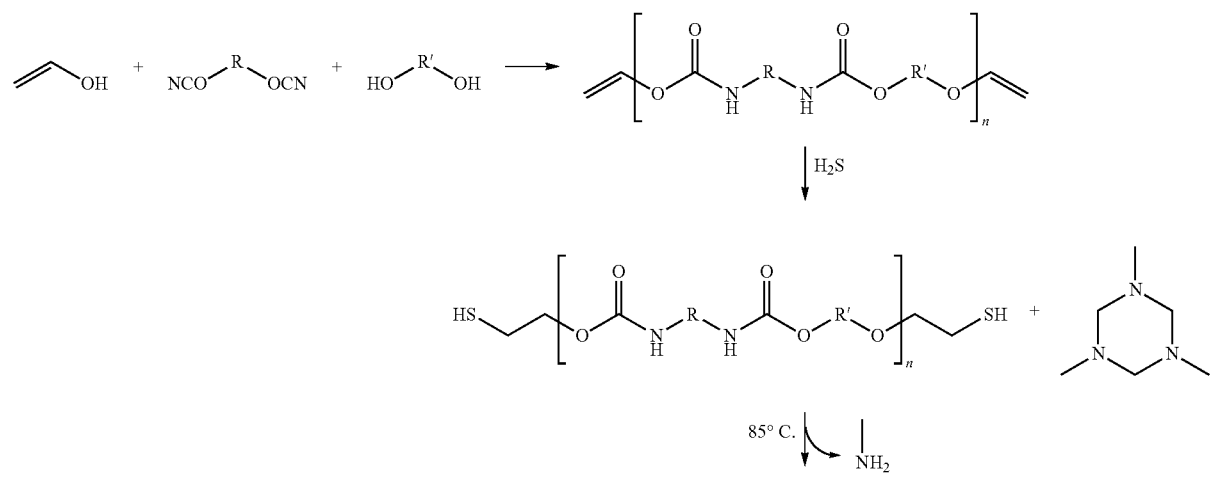

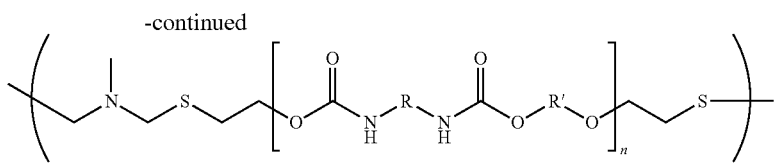

The polythioaminal end capped urethane material, as shown in reaction example 2, may be known as a ABA structured copolymer in which A are biodegradable polythioaminal segments, and B is a polyurethane segment, and the number of repeated ABA units (everything in parentheses in reaction example 2) may be at least 2.

In other embodiments of this disclosure, polyurethanes containing hydrolyzable polythioaminal groups are produced using an approach that is different from the aforementioned reaction example 2. The alternative approach involves the incorporation of thiol groups in a pendant group of a polyurethane oligomer or polymer, in contrast to urethane polymer chain end capped thiol groups that may lead to an ABA polymer. As shown in reaction example 3, urethane materials with pendant thiol groups may be produced by adding a diol that contains pendant unsaturated carbon groups, such as 5-norbornene-2,2-dimethanol, to the monomer mixture. In this approach, we do not restrict the diol containing a pendant functional group, therefore any pendant functional group may be used that may be converted to a thiol or thiols for further reaction, such as a diol acrylate for example. Materials used in the aforementioned synthesis are available from Sigma-Aldrich, USA and Sartomer, USA.

Reaction Example 3

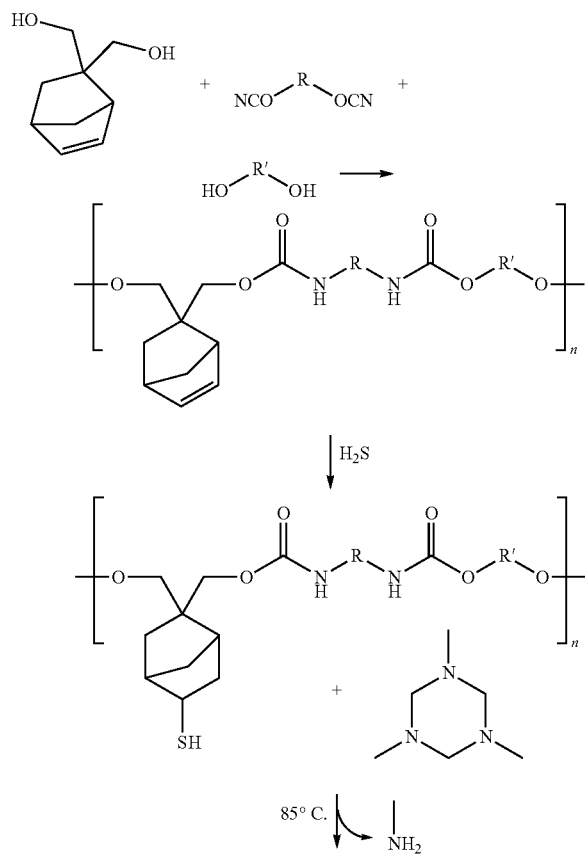

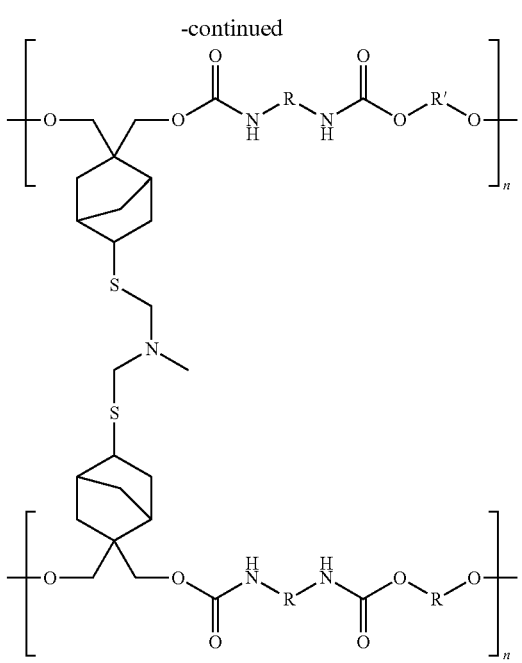

As shown, the pendant double bond may be converted to a thiol group through the use of hydrogen sulfide. In the same manner described in the case of chain extended degradable polyurethanes (ABA polymer), the pendant thiol containing oligomers or polymers may be reacted with hexahydrotriazines under similar conditions to install degradable thioaminal crosslinks. Notably, the polymer compositions of this disclosure that contain polythioaminal groups or segments may be readily degraded aqueous environments and in the presence of monothiols and acids. Monothiols may exchange with the thioaminal groups in a polythioaminal segment, resulting in cleavage of polymer segments. The rate of hydrolysis and/or cleavage of thioaminal groups may increase at lower pH values and higher ambient or local temperatures.

In other embodiments of this disclosure, random copolymers may be produced containing degradable/hydrolytically unstable thioaminal groups and oligomeric or polymeric urethane segments by mixing and heating all the reagents or starting materials together in one reaction vessel ("one pot") without sequential addition of reagents/starting materials and/or intermediate isolation and purification steps. In these embodiments, a diisocynate, a diol, a dithiol and a hexahydrotriazine are all combined in a reaction vessel, heated, reacted, and then isolated per the experimental procedure outlined previously for reaction example 1. The complex reaction mixture will produce random copolymers containing a random combination of urethane segments or groups and degradable thioaminal segments or groups which may be suitable for use in biomedical applications. Reaction example 4 illustrates a reaction scheme that may be used to make this random copolymer.

Reaction Example 4

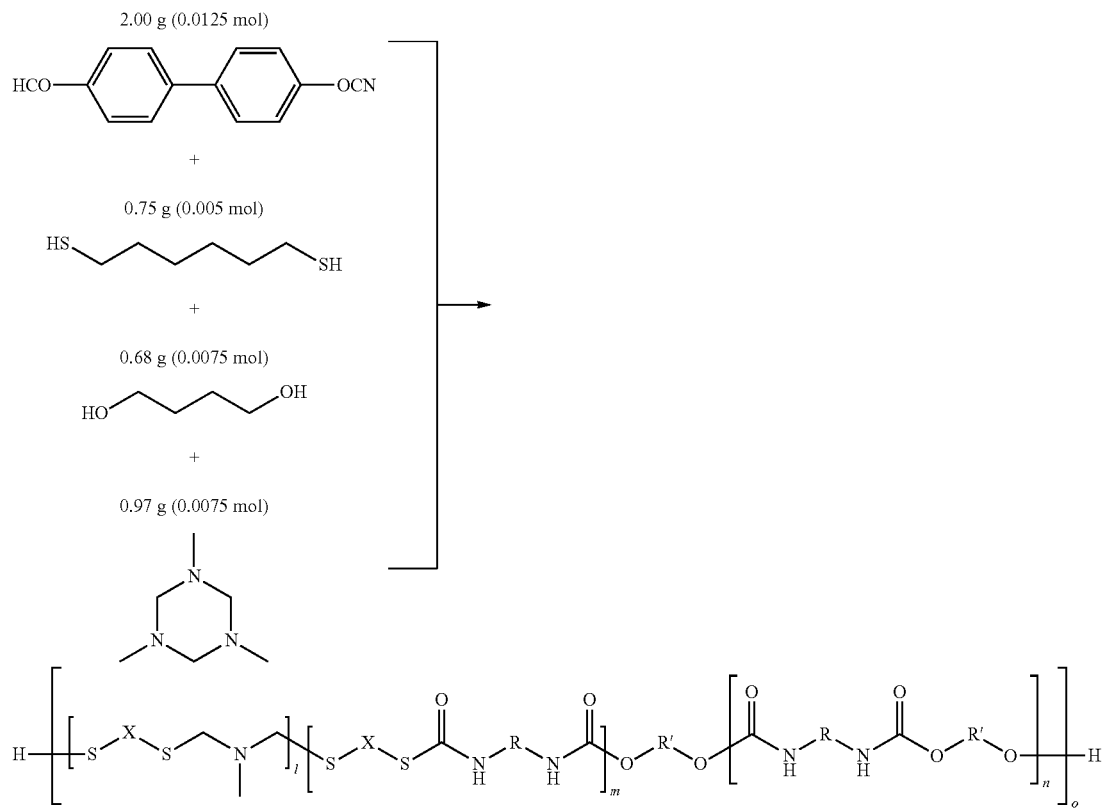

As illustrated in reaction example 4, "X", R, and/or R' may an organic or a hetero-organic group (containing atoms other than C, such as N, O and others), and may be oligomeric or polymeric. In the formula above, l, m, and o are each integers having a value of 1 or more, and each instance of l, m, and o may be the same as, or different from, any other instance of l, m, and o.

As mentioned prior, the oligomers and polymers of this invention are susceptible to hydrolysis upon exposure to aqueous media and catalytic acids, such as protonic acids, for example HCl and the like. As illustrated in FIG. 1, size exclusion chromatography experiments show that a water soluble polythioaminal will slowly undergo degradation or hydrolysis in aqueous environments for extended periods of time (from 0 hours to 93 hours). The experiments reveal that the number average molecular weight ($M_n$) decreases in the aqueous environment to about ⅛ of its original value over the 96 hours. The letters m and l denote the number of repeat units before and after hydrolysis, and the inset table describes the molecular weight as a function of time.

While the foregoing is directed to embodiments of the present disclosure, other and further embodiments of the disclosure may be devised without departing from the basic scope thereof, and the scope thereof is determined by the claims that follow.

What is claimed is:

1. A method of producing a biodegradable urethane material comprising thioaminal groups, comprising:
    forming a urethane oligomer or a urethane polymer with functional groups;
    reacting the functional groups with a sulfur compound to produce thiol groups; and
    heating and reacting the thiol groups with hexahydrotriazine compounds to produce a biodegradable urethane material comprising thioaminal groups.

2. The method of claim 1, wherein the functional groups are terminal groups.

3. The method of claim 1, wherein the functional groups are pendant groups.

4. The method of claim 1, wherein the functional groups are unsaturated carbon groups.

5. The method of claim 4, wherein the functional groups are alkene groups.

6. The method of claim 1, wherein the sulfur compound is dihydrogen sulfide.

7. The method of claim 1 wherein the thiols groups are a reaction product of a Michael addition reaction.

8. The method of claim 1 wherein the forming a urethane oligomer or a urethane polymer with functional groups, reacting the functional groups with a sulfur compound to produce thiol groups, and heating and reacting the thiol groups with hexahydrotriazine compounds to produce a biodegradable urethane material comprising thioaminal groups are performed in one reaction vessel.

9. The method of claim 1 wherein the biodegradable urethane material comprising thioaminal groups is a reaction product of a sequential addition of some of the starting materials.

10. The method of claim 1 wherein the biodegradable urethane material comprising thioaminal groups hydrolyzes in aqueous media.

11. The method of claim 10 wherein the hydrolysis products of the biodegradable urethane material comprising thioaminal groups are non-toxic.

\* \* \* \* \*